(12) United States Patent
Kaltenbach et al.

(10) Patent No.: US 8,702,546 B2
(45) Date of Patent: Apr. 22, 2014

(54) DEVICE FOR A DRIVE TRAIN OF A HYBRID VEHICLE, DRIVE TRAIN AND METHOD FOR OPERATING SAME

(75) Inventors: Johannes Kaltenbach, Friedrichshafen (DE); Kai Borntraeger, Langenargen (DE)

(73) Assignee: ZF Friedrichshafen AG, Friederichshafen (DE)

( * ) Notice: Subject to any disclaimer, the term of this patent is extended or adjusted under 35 U.S.C. 154(b) by 0 days.

(21) Appl. No.: 13/988,834

(22) PCT Filed: Nov. 8, 2011

(86) PCT No.: PCT/EP2011/069590
§ 371 (c)(1),
(2), (4) Date: May 22, 2013

(87) PCT Pub. No.: WO2012/079850
PCT Pub. Date: Jun. 21, 2012

(65) Prior Publication Data
US 2013/0260939 A1     Oct. 3, 2013

(30) Foreign Application Priority Data
Dec. 17, 2010   (DE) .......................... 10 2010 063 311

(51) Int. Cl.
*F16H 3/72*      (2006.01)
*F16H 37/06*     (2006.01)

(52) U.S. Cl.
USPC ................................. 475/5; 475/150; 903/910

(58) Field of Classification Search
USPC .............. 475/1, 5, 8, 149, 150, 311; 903/910; 180/65.235, 65.25
See application file for complete search history.

(56) References Cited

U.S. PATENT DOCUMENTS

| 5,735,770 A | 4/1998 | Omote et al. |
| 6,805,648 B1 | 10/2004 | Ehrlinger |

(Continued)

FOREIGN PATENT DOCUMENTS

| DE | 196 50 723 A1 | 6/1997 |
| DE | 199 34 696 A1 | 5/2001 |

(Continued)

OTHER PUBLICATIONS

German Search Report Corresponding to 10 2010 063 311.9 mailed Dec. 21, 2011.

(Continued)

*Primary Examiner* — Justin Holmes
(74) *Attorney, Agent, or Firm* — Davis & Bujold, PLLC; Michael J. Bujold

(57) ABSTRACT

A device for a drive-train of a hybrid vehicle having a planetary gear system that comprises three elements, namely, a ring gear, sun gear and carrier. A first element of these elements of the planetary gear system has a fixed connection with a transmission input shaft of a transmission. A second element of the elements of the planetary gear system has a fixed connection with an electric machine of a hybrid drive. A clutch which can couple two of the three elements of the planetary gear system with one another. Additionally, a shifting element is provided by which a third element, of these three elements of the planetary gear system, can be coupled, in a first shift position, to an internal combustion engine of the hybrid drive and, in a second shift position, to one of a housing or a stator.

15 Claims, 3 Drawing Sheets

(56) References Cited

U.S. PATENT DOCUMENTS

| | | |
|---|---|---|
| 8,083,639 B2 * | 12/2011 | Wallner et al. ............... 477/4 |
| 8,480,525 B2 * | 7/2013 | Reichert et al. ............... 475/5 |
| 8,585,522 B2 * | 11/2013 | Kaltenbach et al. ........... 475/5 |
| 2002/0065168 A1 | 5/2002 | Kima |
| 2011/0127095 A1 * | 6/2011 | Imamura et al. ........ 180/65.285 |
| 2012/0220403 A1 | 8/2012 | Reichert et al. |

FOREIGN PATENT DOCUMENTS

| | | |
|---|---|---|
| DE | 10 2006 028 602 A1 | 12/2007 |
| DE | 10 2007 051 473 A1 | 4/2009 |
| DE | 10 2008 011 080 A1 | 8/2009 |
| DE | 10 2009 000 725 A1 | 8/2010 |
| DE | 10 2009 046 366 A1 | 5/2011 |
| WO | 2007/147732 A1 | 12/2007 |
| WO | 2008/071151 A1 | 6/2008 |

OTHER PUBLICATIONS

International Search Report Corresponding to PCT/EP2011/069590 mailed Jan. 31, 2012.
Written Opinion Corresponding to PCT/EP2011/069590 mailed Jan. 31, 2012.

\* cited by examiner

DEVICE FOR A DRIVE TRAIN OF A HYBRID VEHICLE, DRIVE TRAIN AND METHOD FOR OPERATING SAME

This application is a National Stage completion of PCT/EP2011/069590 filed Nov. 8, 2011, which claims priority from German patent application serial no. 10 2010 063 311.9 filed Dec. 17, 2010.

FIELD OF THE INVENTION

The invention concerns a device for a drive-train of a hybrid vehicle, a drive-train of a hybrid vehicle with such a device, and methods for operating the same.

BACKGROUND OF THE INVENTION

From DE 199 34 696 A1 a drive-train of a hybrid vehicle is known, which drive-train comprises an internal combustion engine and an electric machine. In addition the drive-train known from this prior art comprises a transmission connected between the drive aggregate and a drive output of the drive-train, the internal combustion engine, the electric machine and the transmission being coupled to one another by means of a device comprising a planetary gear system and a clutch. The planetary gear system comprises as elements a ring gear, a sun gear and a carrier, wherein two of these three elements of the planetary gear system can be coupled by means of the clutch, which then serves as a bridging clutch. Such a drive-train of a hybrid vehicle is also referred to as an electro-dynamic drive system.

With such a drive system a defined range of functions can be implemented with a drive-train of a hybrid vehicle. However, there is a need to extend the functional range of such a drive-train.

SUMMARY OF THE INVENTION

Starting from there the purpose of the present invention is to provide a new type of device for a drive-train of a hybrid vehicle and a new type of drive-train and methods for operating the same.

This objective is achieved by a device according to the invention which comprises a shifting element, by means of which, in a first shift position of the shifting element a third element of the elements of the planetary gear system can be coupled to an internal combustion engine of the hybrid drive and in a second shift position of the shifting element it can be connected fixed to the housing or the stator.

With the present invention it is proposed that the third element of the planetary gear system, which in the electro-dynamic drive system of the prior art can be coupled fixed to the internal combustion engine, should be coupled either to the internal combustion engine or alternatively to the housing or stator, depending on the shift position of a shifting element. In this way the functional range of the drive-train of a hybrid vehicle known from the prior art can be extended. The solution according to the invention does not depend on the design of the internal combustion engine and the design of the transmission connected between the drive aggregate and the drive output, so the device according to the invention, which comprises at least the planetary gear system, the clutch and the shifting element, can be provided as a module independent of the internal combustion engine type and the transmission type.

According to an advantageous further development, the third element of the elements of the planetary gear system can be decoupled both from the internal combustion engine and from the housing, so that the third element can rotate freely. In this way the functional range of the drive-train of a hybrid vehicle known from the prior art can be extended even more.

BRIEF DESCRIPTION OF THE DRAWINGS

Preferred further developments of the invention emerge from the description given below. Example embodiments of the invention, to which it is not limited, are explained in more detail with reference to the drawings, which show.

DETAILED DESCRIPTION OF THE PREFERRED EMBODIMENTS

Figure 1:
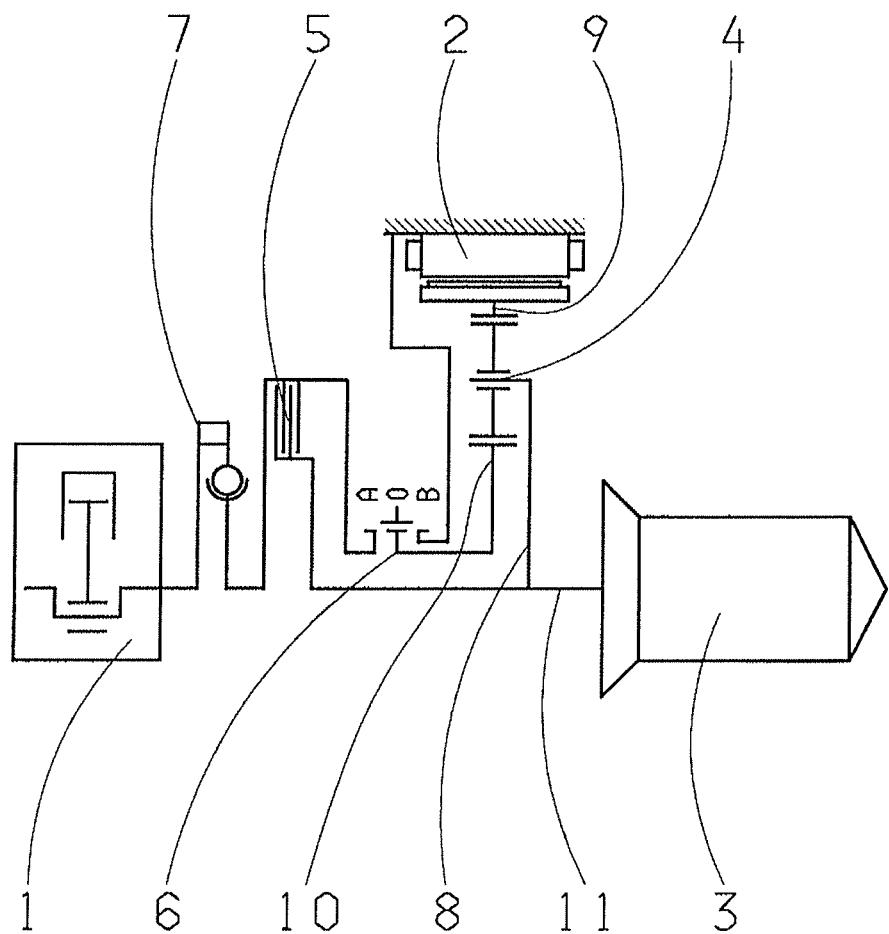
FIG. 1: A diagram of a drive-train according to the invention having a device according to the invention, according to a first example embodiment of the invention.

FIG. 1 shows an example embodiment of a drive-train of a hybrid vehicle together with a device for such a drive-train, wherein the drive-train in FIG. 1 comprises a hybrid drive with an internal combustion engine 1 and an electric machine 2, and a transmission 3 is connected between the hybrid drive or drive aggregate and a drive output (not shown), the transmission preferably being an automatic or automated change-speed transmission.

Between the drive aggregate or hybrid drive, which consists of the internal combustion engine 1, the electric machine 2 and the transmission 3, is connected a device according to the invention for such a drive-train, the device according to the invention comprising at least a planetary gear system 4, a clutch 5 and a shifting element 6. FIG. 1 also shows a torsion damper 7 associated with the internal combustion engine for connecting it to the planetary gear system 4.

The planetary gear system comprises at least the elements of a carrier 8, ring gear 9 and sun gear 10, wherein a first element of these three elements 8, 9 and 10 of the planetary gear system serves for the fixed connection of a transmission input shaft 11 of the transmission 3 and wherein a second element of the three elements 8, 9 and 10 of the planetary gear system 4 serves for the fixed connection of the electric machine 2. In the example embodiment shown in FIG. 1 the first element, which serves for the connection of the transmission input shaft 11 of the transmission 3, is the carrier 8 of the planetary gear system 4 and the second element of the planetary gear system 4, which serves for the fixed connection of the electric machine 2, is the ring gear 9 of the planetary gear system 4.

By means of the shifting element 6, a third element of the three elements 8, 9 and 10 of the planetary gear system 4 can be coupled to the internal combustion engine 1 when the shifting element is in a first shift position A, whereas in a second shift position B of the shifting element 6, the third element of the three elements 8, 9 and 10 of the planetary gear system 4 can be coupled to the housing or stator, the third element of the planetary gear system 4 in FIG. 1 being the sun gear 10 of the planetary gear system 4.

The clutch 5 can be coupled between two of the three elements 8, 9 and 10 of the planetary gear system 4, namely in the example embodiment of FIG. 1 in the shift position A of the shifting element 6 between the carrier 8 and the sun gear 10.

In the example embodiment shown in FIG. 1 the shifting element 6 comprises, besides its two shift positions A and B, a further shift position O such that in this shift position O of the shifting element 6 the third element of the planetary gear system 4, namely in FIG. 1 the sun gear 10, is decoupled both from the internal combustion engine 1 and also from the housing, so that the third element of the planetary gear system 4, namely the sun gear 10 in FIG. 1, can rotate freely.

Figure 2:
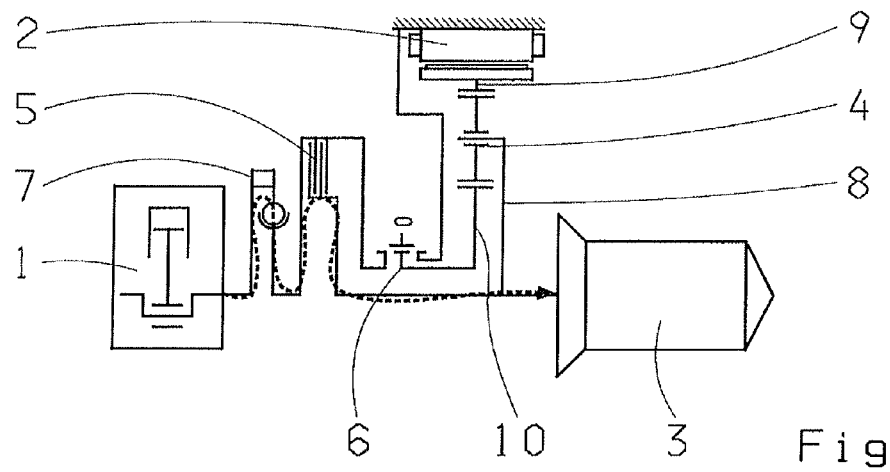
FIG. 2: The drive-train according to the invention and the device according to the invention, from FIG. 1, shown in a first condition.
Figure 3:
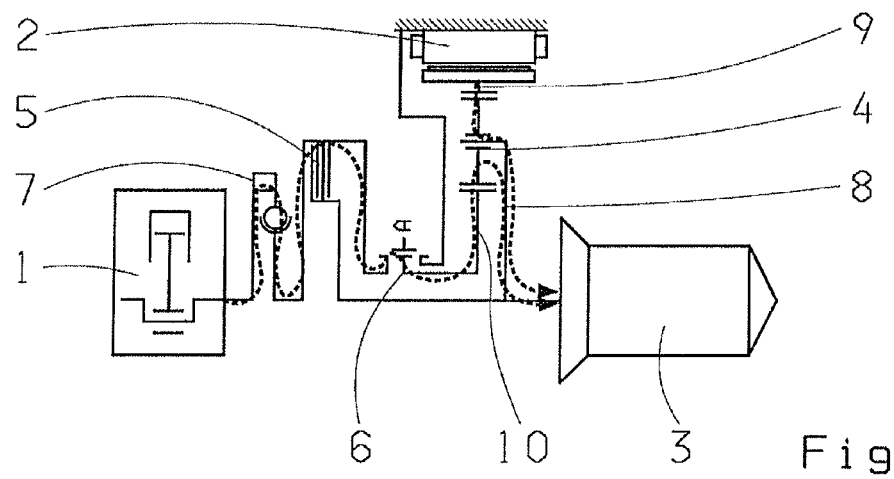
FIG. 3: The drive-train and device according to the invention, from FIG. 1, shown in a second condition.
Figure 4:
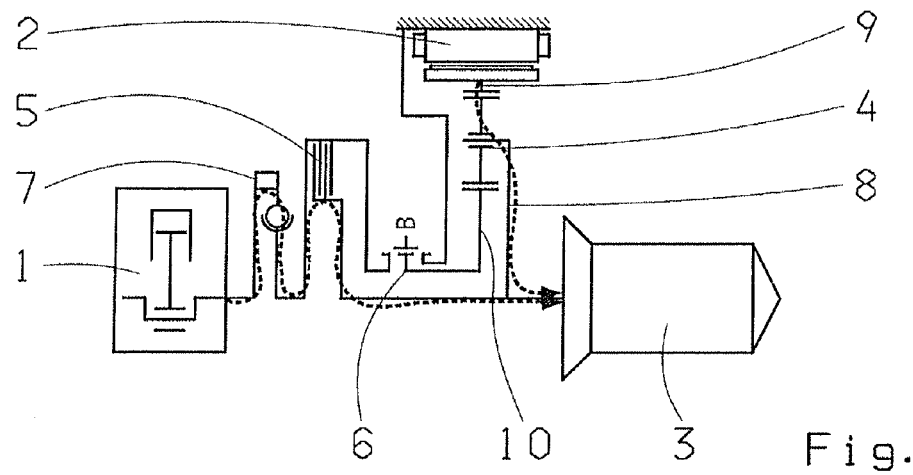
FIG. 4: The drive-train and device according to the invention, from FIG. 1, shown in a third condition.

FIGS. 2 to 4 show for the example embodiment in FIG. 1 the force flows or torque flows from the internal combustion engine 1 and the electric machine 2 to the transmission 3 in the three shift conditions O, A and B.

Although a shifting element 6 with the three shift positions O, A and B is preferred, it is also possible to have a shifting element 6 with only the two shift positions A and B.

In the condition shown in FIG. 2 the shifting element 6 is in shift position O, and accordingly in this condition the third element of the planetary gear system 4, namely according to FIGS. 1 to 4 the sun gear 10 of the planetary gear system 4, is not coupled either to the internal combustion engine 1 or to the housing or stator, so that the third element, i.e. in FIG. 1 the sun gear 10 of the planetary gear system 4, can rotate freely.

In this shift position O of the shifting element 6 the electric machine 2 is braked to rest by virtue of the cogging torque.

In shift position O no zero-load losses occur in the electric machine 2, which could occur in a rotating electric machine 2 owing to rotating field generation.

The shift position O is selected in particular during constant driving, i.e. driving of the hybrid vehicle at a relatively constant driving speed at which there is no great demand for electrical energy, so as to, in effect, decouple the electric machine 2 from the internal combustion engine 1.

When the shifting element 6 is in its shift position O, the drive-train behaves like a conventional drive with the internal combustion engine 1 alone, so that no hybrid functions are possible.

The condition shown in FIG. 2, in which the shifting element 6 is in its shift position O, is also suitable for emergency operation of the hybrid vehicle. Thus, particularly at very low rotational speeds, synchronous machines in so-termed active short-circuit have a very large torque which if the characteristic field regulation is inactive would make it impossible to start. By decoupling the third element of the planetary gear system 4, namely in FIGS. 1 to 4 the sun gear 10 of the planetary gear system 4, such a torque cannot have a braking action on the transmission input, namely the transmission input shaft 11 of the transmission 3, and this can therefore transmit the full torque of the internal combustion engine 1.

When, as in FIG. 3, the shifting element 6 is in its shift position A, the planetary gear system 4 serves as a superposition gear system and the clutch 5 is connected as a bridging clutch between the third element of the planetary gear system and the first element thereof, i.e. according to FIG. 1 between the sun gear 10 and the carrier 8. When the shifting element 6 is in its first shift position A the electric machine 2 can deliver torque to the second element of the planetary gear system 4, namely in FIG. 1 the ring gear 9, and the drive torque at the transmission input shaft 11 of the transmission 3 is a summation torque of the torque delivered by the internal combustion engine 1 and the torque delivered by the electric machine 2.

In this shift position A of the shifting element 6 the drive-train behaves basically like the electro-dynamic drive-train known from DE 199 34 696 A1. As already explained, the clutch 5 then acts as a bridging clutch of the planetary gear system 4.

When the shifting element 6 is in its shift position B as shown in FIG. 4 the third element of the planetary gear system 4, namely in FIGS. 1 and 4 the sun gear 10, is decoupled from the internal combustion engine 1 and is coupled fixed to the housing. The clutch 5 then acts as a separator clutch for the internal combustion engine 1 and the planetary gear system 4 has a constant gear ratio, so that the electric machine 2 is connected to the transmission input shaft 11 with the gear ratio of the planetary gear system 4.

In this shift position B of the shifting element 6 pure electric driving with a stepped-up electric machine 2 is possible.

Figure 5:
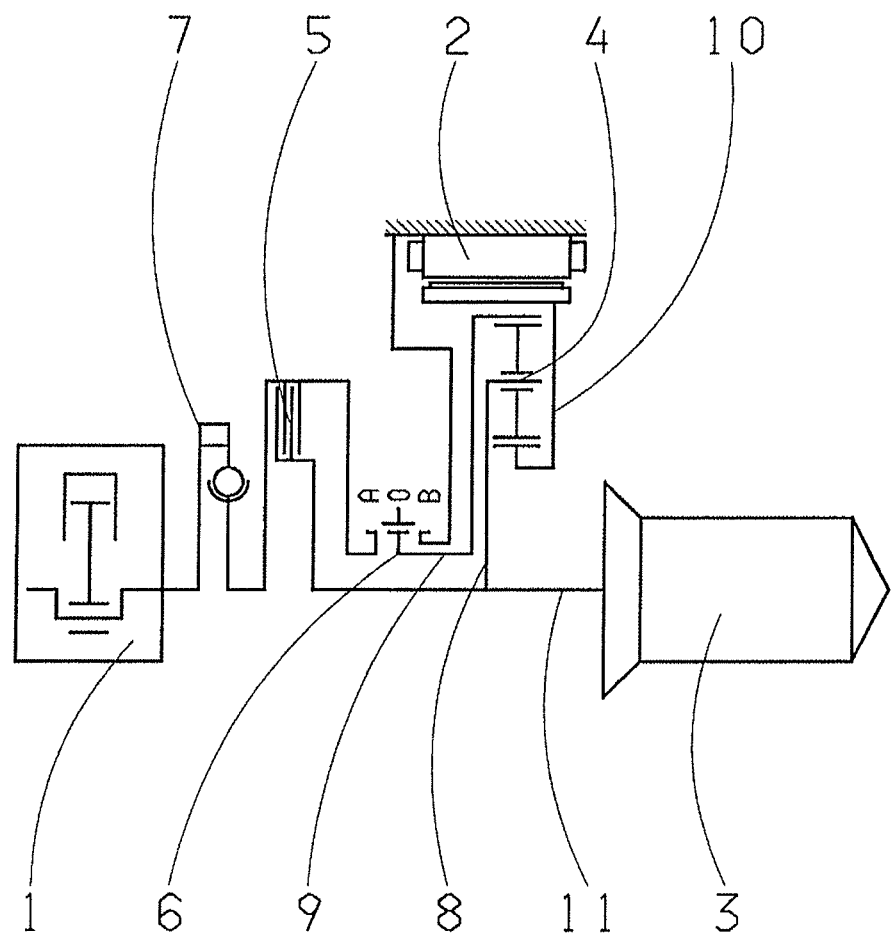
FIG. 5: A diagram of a drive-train according to the invention having a device according to the invention, according to a second example embodiment of the invention.

FIG. 5 shows an alternative design of the invention, in which compared with the example embodiment of FIGS. 1 to 4, the connection of the internal combustion engine 1 and the electric machine 2 is different in order to be able to obtain different gear ratios.

In FIG. 5 the first element, which serves for the connection of the transmission input shaft 11 of the transmission 3, is the carrier 8 of the planetary gear system 4 and the second element of the planetary gear system 4, which serves for the fixed connection of the electric machine 2, is the sun gear 10 of the planetary gear system 4. The third element, which in a first shift position A of the shifting element 6 can be coupled to the internal combustion engine 1 and in a second shift position B of the shifting element 6 can be coupled to the housing or stator, is in FIG. 5 the ring gear 9 of the planetary gear system 4.

In FIGS. 1 to 5 the planetary gear system 4 is preferably a minus gearset. In another variant of the invention (not shown) the planetary gear system 4 can also be designed as a so-termed plus gearset.

If the planetary gear system 4 is designed as a plus gearset, then the first element of the planetary gear system, which serves to connect the transmission input shaft 11 of the transmission 3, is the ring gear of the planetary gear system, the second element of the planetary gear system, which serves to connect the electric machine 2, is then the sun gear of the planetary gear system, and the third element of the planetary gear system, which by means of the shifting element 6 can selectively be coupled to the internal combustion engine 1 or to the housing, is then the carrier of the planetary gear system.

When the hybrid vehicle is at rest or driving at low speeds, then if the charge level of an electrical energy accumulator is above a defined charge limit for the charge level, the shifting element 6 is preferably operated in shift position B so that purely electric driving-off from when the vehicle is at rest is possible. At other charge levels the shift position A is selected so that the vehicle can be started even though the charge level of the energy accumulator is low.

During recuperation, i.e. when braking by means of the electric machine 2, the shifting element 6 adopts the second shift position B so that by means of the clutch 5 the internal combustion engine 1 can be decoupled and switched off.

As already mentioned, the shifting element 6 adopts its shift position O particularly during constant driving, i.e. driving at essentially constant speed, and in the event that the electric machine 2 has failed.

During constant driving little generator-produced electrical energy is needed, so to avoid zero-load losses the electric machine 2 can be decoupled from the drive-train. If the electric machine 2 develops a fault, then by virtue of the shift position O of the shifting element 6 the behavior of a conventional drive-train powered purely by an internal combustion engine can be obtained.

The shifting element 6 is preferably an interlocking shifting element. The clutch 5 can be a friction clutch or an interlocking clutch.

The use of a friction clutch is preferred. However, most functions can also be implemented with an interlocking clutch, for example an unsynchronized claw clutch.

The present invention also concerns methods for operating a device according to the invention and a drive-train according to the invention which has a device according to the invention.

A first method according to the invention concerns the shifting of the shifting element 6 from shift position A to shift position B when the clutch 5 is initially open. Thus, in the starting position, for this method shift position A of the shifting element 6 is engaged and the clutch 5 is open, so that the vehicle can then be started with the drive-train working as an electro-dynamic drive system until the planetary gear system 4 is in so-termed block rotation in which the rotational speeds of the three elements 8, 9 and 10 are equal. In this condition the clutch 5 can then be closed synchronously. In order now to change the shifting element from shift position A to shift position B, the electric machine 2 is first made preferably completely free from load and its load so far as possible, i.e. completely or partially, is transferred to the internal combustion engine 1, whereby in relation to shift position A the shifting element 6 has then been made load free so that shift position A can then be disengaged while free from load. Thereafter, by operating the electric machine 2 in a speed-regulated manner the shifting element 6 is synchronized in relation to shift position B, which in the example embodiment of FIGS. 1 to 4 means that a rotational speed preferably of zero is produced at the sun gear 10. The shift position B is then engaged in the shifting element 6. After this the load can be built up at the electric machine 2, for example by operating it as a generator. This method can be carried out both when the clutch 5 is an interlocking clutch and when it is a friction clutch. An advantage of this method is that during the shift of the shifting element 6 from shift position A to shift position B there is no interruption of the traction force, because the internal combustion engine 1 delivers torque to the transmission input shaft 11 by way of the closed clutch 5.

A second method according to the invention concerns the shifting of the shifting element 6 from shift position B to shift position A when the clutch 5 is open, this method too being possible to implement both with a friction clutch and with an interlocking clutch 5. In the starting situation for this method the shift position B is therefore engaged in the shifting element 6 and the clutch 5 is open. To shift from shift position B to shift position A, first the electric machine 2 is made free from load, this involving a traction force interruption, and shift position B is then disengaged. Then, by operating the electric machine 2 in a speed-regulated manner the shifting element 6 is synchronized in relation to shift position A and after that the shift position A is engaged. For the synchronization of the shifting element 6 in relation to shift position A the shifting element can be synchronized to the idling speed of the internal combustion engine 1.

A third method according to the invention concerns shifting the shifting element 6 from shift position B to shift position A with the clutch 5 closed, and this method too can be carried out with a friction clutch 5 or an interlocking clutch 5. In this case at the start, i.e. with shift position B engaged and the clutch 5 closed, the electric machine 2 is made free from load and its load so far as possible, i.e. completely or partially, is transferred to the internal combustion engine 1. Then, in relation to shift position B the shifting element 6 is free from load so that the shift position B can be disengaged in a load-free condition. Thereafter, by means of speed-regulated operation of the electric machine 2 the shifting element 6 is synchronized in relation to shift position A and shift position A is then engaged. For the synchronization of the shifting element 6 in relation to shift position A, the synchronization takes place in relation to the current running speed of the internal combustion engine 1.

If with shift position A engaged the clutch 5 is opened, then the load of the internal combustion engine 1 is supported with the help of the electric machine 2 so that the clutch 5 becomes free from load. A torque ratio of the internal combustion engine 1 and the electric machine 2 required for this is defined by the so-termed constant gear ratio of the planetary gear system 4.

If necessary the load on the internal combustion engine 1 is reduced until the electric machine 2 can support the torque of the internal combustion engine 1. Thereafter, the clutch 5 can be opened while free from load.

Further methods according to the invention, which are described below, concern shifting the shifting element 6 from shift position B to shift position A, in each case without traction force interruption and in each case with the clutch 5 initially open. These methods can only be carried out with a friction clutch 5 because in the methods the clutch 5 has to be operated with slip.

One of these two methods concerns a shift of the shifting element 6 from shift position B to shift position A without traction force interruption at the drive output, with the clutch 5 initially open, this being carried out for example for a transition from purely electric crawling in shift position B to electro-dynamic crawling in shift position A without traction force interruption. Such a transition can for example be necessary if purely electric crawling has been taking place for a long time and due to this the electrical energy accumulator has been discharged, in order to then operate the electric machine 2 as a generator during the electro-dynamic crawling and thus re-charge the electrical energy accumulator.

Accordingly, in the starting situation for this method, shift position B is engaged in the shifting element 6, the clutch 5 is open and the internal combustion engine 1 is running. To now carry out the shift from shift position B to shift position A, load is first transferred from the electric machine 2 to the clutch 5, whereby the internal combustion engine 1 completely takes up the drive torque from the electric machine 2 by way of the clutch 5 so that the torque is completely eliminated from the electric machine 2. At low driving speeds, during this the clutch 5 is slipping. Consequently, in relation to shift position B the shifting element 6 is free from load so that the shift position B can then be disengaged without load. With the help of the electric machine 2 operated with speed regulation, the shifting element 6 can be synchronized in relation to shift position A and shift position A can then be engaged.

Thereafter, a load build-up preferably takes place at the electric machine 2 so that the clutch 5 becomes free from load. During this the electric machine 2 supports the torque of the internal combustion engine 1 so that no torque is any longer transmitted by the clutch 5. In this case the torque of the internal combustion engine 1 is preferably reduced in such manner that the transmission input torque of the transmission 3 is not increased. Thereafter, the clutch 5 is opened.

In another method the shifting element 6 is shifted from shift position A to shift position B without traction force interruption, with the clutch 5 initially open, for example in order to enable a transition from electro-dynamic crawling in shift position A to electric crawling in shift position B without interrupting the traction force. Such a shift is necessary, for example, when in shift position A, electro-dynamic crawling in the generator mode has taken place for a long time and the charge level of the electrical energy accumulator exceeds a critical limit value. In such a case a shift to shift position B must take place, in which the electric machine 2 is operated as a motor in order to discharge the electrical energy accumulator.

In the starting condition for this method shift position A is engaged in the shifting element 6, the clutch 5 is open and the internal combustion engine 1 is running. First there is a load transfer from the electric machine 2 to the clutch 5, so that by way of the clutch 5 the internal combustion engine 1 takes over the drive torque of the electric machine 2 completely, during which process at low driving speeds the clutch 5 is operated with slip. The torque at the electric machine 2 is thus completely eliminated, whereby in relation to shift position A the shifting element 6 becomes free from load. The shift position A can then be disengaged and thereafter, by operating the electric machine 2 in a speed-regulated manner, the shifting element 6 is synchronized in relation to shift position B so that shift position B can be engaged. After that, load is transferred from the internal combustion engine 1 to the electric machine 2 so that the load builds up at the electric machine 2 and decreases at the internal combustion engine 1.

Owing to the load decrease at the internal combustion engine 1 the clutch 5 becomes load free so that the clutch 5 can be opened while free from load. After this, purely electric crawling takes place and the internal combustion engine 1 can be operated at idling speed or can even be switched off.

INDEXES

1 Internal combustion engine
2 Electric machine
3 Transmission
4 Planetary gear system
5 Clutch
6 Shifting element
7 Torsion damper
8 Carrier
9 Ring gear
10 Sun gear
11 Transmission input shaft

The invention claimed is:

1. A device for a drive-train of a hybrid vehicle comprising a planetary gear system (4) which comprises three elements, the three elements of the planetary gear system being a ring gear (9), a sun gear (10) and a carrier (8),
   a first element of the three elements (8, 9, 10) of the planetary gear system being fixedly connected to a transmission input shaft (11) of a transmission (3),
   a second element of the three elements (8, 9, 10) of the planetary gear system being fixedly connected to an electric machine (2) of a hybrid drive,
   two elements of the three elements (8, 9, 10) of the planetary gear system being connectable with a clutch (5), and
   a shifting element (6) by which a third element of the three elements (8, 9, 10) of the planetary gear system being couplable, in a first shift position (A), to an internal combustion engine (1) of the hybrid drive and, in a second shift position (B), the third element of the three elements (8, 9, 10) of the planetary gear system being couplable to either a housing or a stator.

2. The device according to claim 1, wherein in the first shift position (A) of the shifting element (6), the planetary gear system (4) is a superposition gear system and the clutch (5) is connectable as a bridging clutch between the third element of the planetary gear system and the first element of the planetary gear system.

3. The device according to claim 1, wherein in the second shift position (B) of the shifting element (6), the planetary gear system (4) serves as a constant gear ratio and the clutch (5) can be coupled, as a separator clutch, between the internal combustion engine (1) and the transmission (3).

4. The device according to claim 1, wherein in a third shift position (O) of the shifting element (6), the third element of the three elements (8, 9, 10) of the planetary gear system (4) is decoupled both from the internal combustion engine (1) and from the housing such that the third element of the three elements is freely rotatable.

5. The device according to claim 1, wherein when a driving speed is lower than a limit value and a charge level of an electrical energy accumulator is higher than another limit value, the shifting element (6) is shifted into the second shift position (B), and at other charge levels of the electrical energy accumulator, the shifting element (6) is shifted into the first shift position (A).

6. The device according to claim 4, wherein the shifting element (6) is shifted into the third shift position (O) when a driving speed is higher than a limit value and is approximately constant.

7. The device according to claim 1, wherein the shifting element (6) adopts the second shift position (B) during braking by the electric machine for recuperation.

8. A drive-train, of a hybrid vehicle, with a drive aggregate comprising an internal combustion engine (1), an electric machine (2), a transmission (3) and a planetary gear system (4) comprising three elements, the three elements of the planetary gear system being a ring gear (9), a sun gear (10) and a carrier (8),
   a first element of the three elements (8, 9, 10) of the planetary gear system being fixed coupled to a transmission input shaft (11) of the transmission,
   a second element of the three elements (8, 9, 10) of the planetary gear system being fixed coupled to the electric machine (2),
   a clutch (5) for coupling two of the three elements (8, 9, 10) of the planetary gear system, and
   a shifting element (6) by which a third element of the three elements (8, 9, 10) of the planetary gear system being coupled, in a first shift position (A) of the shifting element, to the internal combustion engine (1), and, in a second shift position (B) of the shifting element, to either a housing or a stator.

9. The drive-train according to claim 8, wherein, in the first shift position (A) of the shifting element (6), the planetary gear system (4) is a superposition gear system and the clutch (5) is connectable, as a bridging clutch, between the third element of the planetary gear system and the first element of the planetary gear system;
   in the second shift position (B) of the shifting element (6), the planetary gear system (4) serves as a constant gear ratio and the clutch (5) can be coupled as a separator clutch between the internal combustion engine (1) and the transmission (3); and
   in a third shift position (O) of the shifting element (6), the third element of the three elements (8, 9, 10) of the planetary gear system (4) is decoupled both from the internal combustion engine (1) and from the housing such that the third element of the three elements is freely rotatable.

10. A method of a operating a drive-train of a hybrid vehicle with a device, the drive train having a drive aggregate comprising an internal combustion engine (1), an electric machine (2), a transmission (3) and a planetary gear system (4), the planetary gear system (4) comprising three elements, the three elements of the planetary gear system being a ring gear (9), a sun gear (10) and a carrier (8), a first element of the three elements (8, 9, 10) of the planetary gear system is fixedly coupled to a transmission input shaft (11) of the transmission, a second element of the three elements (8, 9, 10) of the planetary gear system is fixedly coupled to the electric machine (2), and a clutch (5) which couples two of the three elements (8, 9, 10) of the planetary gear system, a shifting element (6) by which a third element of the three elements (8, 9, 10) of the planetary gear system is coupled to the internal combustion engine (1), in a first shift position (A) of the shifting element, and to either a housing or a stator, in a second shift position (B) of the shifting element, the method comprising the steps of:

- initiating a shift of the shifting element (6) from the first shift position (A) to the second shift position (B) when the clutch is initially disengaged;
- engaging the clutch (5);
- making the electric machine (2) completely free from load and transferring the load either completely or partially to the internal combustion engine (1);
- disengaging the first shift position (A);
- synchronizing the shifting element (6) in relation to the second shift position (B) by way of the electric machine (2); and
- engaging the second shift position (B).

11. The method for operating a drive-train according to claim 10, further comprising the steps of:

- initiating a shift of the shifting element (6) from the second shift position (B) to the first shift position (A) when the clutch (5) is disengaged;
- making the electric machine (2) completely free from load and interrupting traction force;
- disengaging the second shift position (B);
- synchronizing the shifting element (6) in relation to the first shift position (A) by way of the electric machine (2); and
- engaging the first shift position (A).

12. The method for operating a drive-train according to claim 10, further comprising the steps of:

- initiating a shift of the shifting element (6) from the second shift position (B) to the first shift position (A) when the clutch (5) is engaged;
- making the electric machine (2) completely free from load and transferring the load either completely or partially to the internal combustion engine (1);
- disengaging the second shift position (B);
- synchronizing the shifting element (6) in relation to the first shift position (A) by way of the electric machine (2); and
- engaging the first shift position (A).

13. The method for operating a drive-train according to claim 10, further comprising the steps of:

- initiating a shift of the shifting element (6) from the second shift position (B) to the first shift position (A) without any traction force interruption when the clutch (5) is initially disengaged;
- transferring the load provided by the electric machine (2) either completely or partially to the internal combustion engine (1) by way of the clutch (5) operated with slip;
- disengaging the second shift position (B);
- synchronizing the shifting element (6) in relation to the first shift position (A) by way of the electric machine (2);
- engaging the first shift position (A);
- building up load at the electric machine (2) and freeing the clutch (5) from load; and
- disengaging the clutch (5).

14. The method for operating a drive-train according to claim 10, further comprising the steps of:

- initiating a shift of the shifting element (6) from the first shift position (A) to the second shift position (B) without traction force interruption when the clutch (5) is initially disengaged;
- transferring the load provided by the electric machine (2) either completely or partially to the internal combustion engine (1) by way of the clutch (5) operated with slip;
- disengaging the first shift position (A);
- synchronizing the shifting element (6) in relation to the second shift position (B) by way of the electric machine (2);
- engaging the second position (B);
- building up the load at the electric machine (2) and freeing the clutch (5) from load; and
- disengaging the clutch (5).

15. The method for operating a drive-train according to claim 10, further comprising the steps of:

- initiating the opening of the clutch (5) when the first shift position (A) of the shifting element (6) is engaged;
- supporting a load provided by the internal combustion engine (1) at the electric machine;
- bringing the clutch (5) to a load-free condition; and
- disengaging the clutch (5) while free from load.

* * * * *